(12) United States Patent
Hollar, Jr. et al.

(10) Patent No.: US 6,362,304 B1
(45) Date of Patent: Mar. 26, 2002

(54) RESIN PREHEATING FOR STEAM PRECIPITATION JET POLYCARBONATE RESIN ISOLATION

(75) Inventors: William Hollar, Jr., Mt. Vernon, IN (US); Renato Hoogeveen, Nieuw Vossemeer; Martin Wilhelm Verbruggen, Halsteren, both of (NL)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/725,598

(22) Filed: Nov. 29, 2000

(51) Int. Cl.[7] ............................................. C08G 64/00
(52) U.S. Cl. ........................................ 528/196; 528/198
(58) Field of Search ................................. 528/196, 198

(56) References Cited

U.S. PATENT DOCUMENTS

| | | |
|---|---|---|
| 3,508,339 A | 4/1970 | Neblett et al. .................. 239/8 |
| 5,317,083 A | 5/1994 | Freitag et al. .............. 528/499 |
| 5,475,084 A | 12/1995 | Okamoto et al. ....... 528/502 E |
| 5,615,831 A | 4/1997 | Molezzi et al. ................. 239/8 |

*Primary Examiner*—Terressa M. Boykin

(57) ABSTRACT

A polycarbonate powder having a relatively lower water content may be produced by preheating a solution of polycarbonate in a nonaqueous solvent (e.g., methylene chloride) prior to subjecting said solution to steam precipitation.

21 Claims, 4 Drawing Sheets

Fig. 4

DATA FOR PREHEATER DISCLOSURE

| | (psig) | | | RESIN T | | C STREAM FLOW | | C RESIN FLOW | | C % SOLIDS | | C FITZ MILL AMPS | |
|---|---|---|---|---|---|---|---|---|---|---|---|---|---|
| | PH? | to | tf | AVERAGE | SIGMA | AVERAGE | SIGMA | AVERAGE | SIGMA | AVERAGE | SIGMA | AVERAGE | SIGMA |
| Ex.1 | N | 8:15 | 9:30 | 63.16 | 1.09 | 9975.35 | 31.95 | 19.84 | 4.28 | 22.13 | 4.13 | 30.35 | 0.57 |
| | Y | 10:00 | 14:30 | 214.59 | 3.76 | 9759.03 | 133.46 | 23.97 | 1.75 | 23.91 | 1.31 | 30.43 | 0.33 |
| Ex.2 | N | 7:30 | 8:30 | 76.43 | 0.48 | 9750.94 | 15.60 | 25.00 | 0.06 | 25.63 | 0.30 | 31.41 | 0.32 |
| | Y | 10:30 | 14:30 | 214.09 | 3.12 | 9240.01 | 244.63 | 25.31 | 4.25 | 26.02 | 0.67 | 32.14 | 0.81 | psig = PRESSURE IN POUNDS PER SQUARE INCH GUAGE
to = START TIME    tf = FINAL TIME
RESIN T = RESIN TEMPERATURE IN DEGREES F
PH? = PRE-HEATING C STEAM FLOW = STEAM FLOW IN POUNDS PER HOUR
C % SOLIDS = WEIGHT PERCENT POLYCARBONATE IN $MeCl_2$
C RESIN FLOW = FEED RATE OF RESIN TO PRECIPITATION
JET IN GALLONS PER MINUTE
C FITZ MILL AMPS = POWER SUPPLIED TO DRYER

EXAMPLE 1: POLYCARBONATE HOMOPOLYMER
EXAMPLE 2: BROMINATED POLYCARBONATE

RESIN PREHEATING FOR STEAM PRECIPITATION JET POLYCARBONATE RESIN ISOLATION

BACKGROUND

The present invention relates generally to steam precipitation methods for producing polycarbonate resin powder from polycarbonate solutions in nonaqueous solvent (e.g., methylene chloride). More specifically, the present invention relates to a more energy efficient method of steam precipitation which produces a powder having a relatively lower water content, thereby avoiding the need for a substantial portion of the post dryer capacity that would otherwise be required to produce an acceptably dry polycarbonate powder.

Polycarbonates are a widely used class of thermoplastic materials, which are prized for their superior clarity and physical toughness. Worldwide yearly production of polycarbonates is greater than 1.5 million metric tons.

One preferred method of producing polycarbonates, which is commonly referred to as the "interfacial method," comprises reacting phosgene and bisphenol-A in a two-phase system having an aqueous and a nonaqueous phase wherein the nonaqueous phase typically comprises methylene chloride as a solvent. Upon reaction, a solution of polycarbonate in methylene chloride is typically formed. Next, the aqueous phase is typically removed and the methylene chloride phase may be washed to help remove residual salts, catalysts and other impurities.

In the final drying step, the polycarbonate in methylene chloride solution must be converted to a dry polycarbonate powder. This step typically accounts for a large fraction of the total production cost because drying the powder is a very energy intensive process, which typically employs hot gas dryers. These dryers require large amounts of electricity and steam to operate and are maintenance intensive. The required electricity and steam are expensive to produce, and their production involves an environmental cost. The drying step is also problematic because the capacity of interfacial polycarbonate synthesis plants is often limited by their capacity to perform this final drying step.

Steam precipitation is a commonly employed industrial method for converting polycarbonate in methylene chloride solution to wet polycarbonate powder. In steam precipitation, the polycarbonate solution is atomized and sprayed into a flowing steam atmosphere. The steam atmosphere is at a sufficient temperature and pressure to cause methylene chloride to evaporate from the small droplets of polycarbonate solution, forming granular particles, which are conventionally recovered in a downstream precipitation piping loop.

Unfortunately, while steam precipitation is relatively efficient at vaporizing the methylene chloride, the steam itself simultaneously partially condenses on the particles, forming a wet powder. The wet powder typically has a water content of from about 25 to about 60 percent by weight. Several downstream dryers are necessary to remove the residual water from the wet powder to produce a dry product powder having an acceptable percent water content (wt.), which is typically less than 1 percent.

By the present invention, Applicants have discovered an improved steam precipitation method for producing polycarbonate powder having a relatively lower water content than powder produced by conventional steam precipitation. The improved method enables the production of dry powder using less energy (i.e., steam and electricity) and potentially fewer dryers (with less maintenance).

SUMMARY OF THE INTENTION

A polycarbonate powder having a relatively lower water content may be produced by preheating a solution of polycarbonate in a nonaqueous solvent (e.g., methylene chloride) prior to subjecting said solution to steam precipitation. A dry product powder is then produced by subsequently further drying the relatively dry powder produced via said steam precipitation process. Preferably, the solution is preheated to a temperature above 130° F., and the steam to resin weight ratio is maintained between 1.2 and 2.5.

In a more specific embodiment, the process for isolating a polycarbonate comprises heating a solution comprising polycarbonate and methylene chloride to a temperature of above 130° F., but below the temperature sufficient to cause decomposition of the polycarbonate. The heated solution is then atomized by spraying the heated solution out of a nozzle into a flowing steam atmosphere. Upon contact with the steam, the nonaqueous solvent evaporates, leaving a wet powder. The steam-to-resin weight ratio used in this process should be between 1.2 and 2.5.

BRIEF DESCRIPTION OF THE DRAWINGS

FIG. 4 depicts a table describing experimental conditions for two comparative examples showing system operation with and without preheating.

DETAILED DESCRIPTION

The text of this application may be better understood with reference to the following definitions.

The term "polycarbonate" refers to all aromatic polymers containing the functional group —O—C(=O)—O—, including copolymers, homopolymers and blends of homopolymers, copolymers and other polymers and materials. For example, halogenated homopolymers, and blends with rubbery materials would be included, as would copolyestercarbonates and other copolymers. Bisphenol-A polycarbonate homopolymer is a preferred polycarbonate.

The term "steam precipitation" refers to a process wherein a solution comprising polycarbonate is atomized in steam, and the solvent evaporates from the atomized particles.

The term "steam to resin weight ratio" refers to the mass ratio flow, per unit time, of steam and resin used in a steam precipitation process. The mass of resin is calculated by considering the concentration of resin dissolved in the resin solution.

The term "wet polycarbonate particles" refers to particles of polycarbonate formed immediately after the steam precipitation process. Such particles typically also contain volatiles, which are mainly water together with some residual organic solvent. The wet powder is typically further dried to produce dry powder, which typically has less than 1% by weight volatiles.

Figure 1:
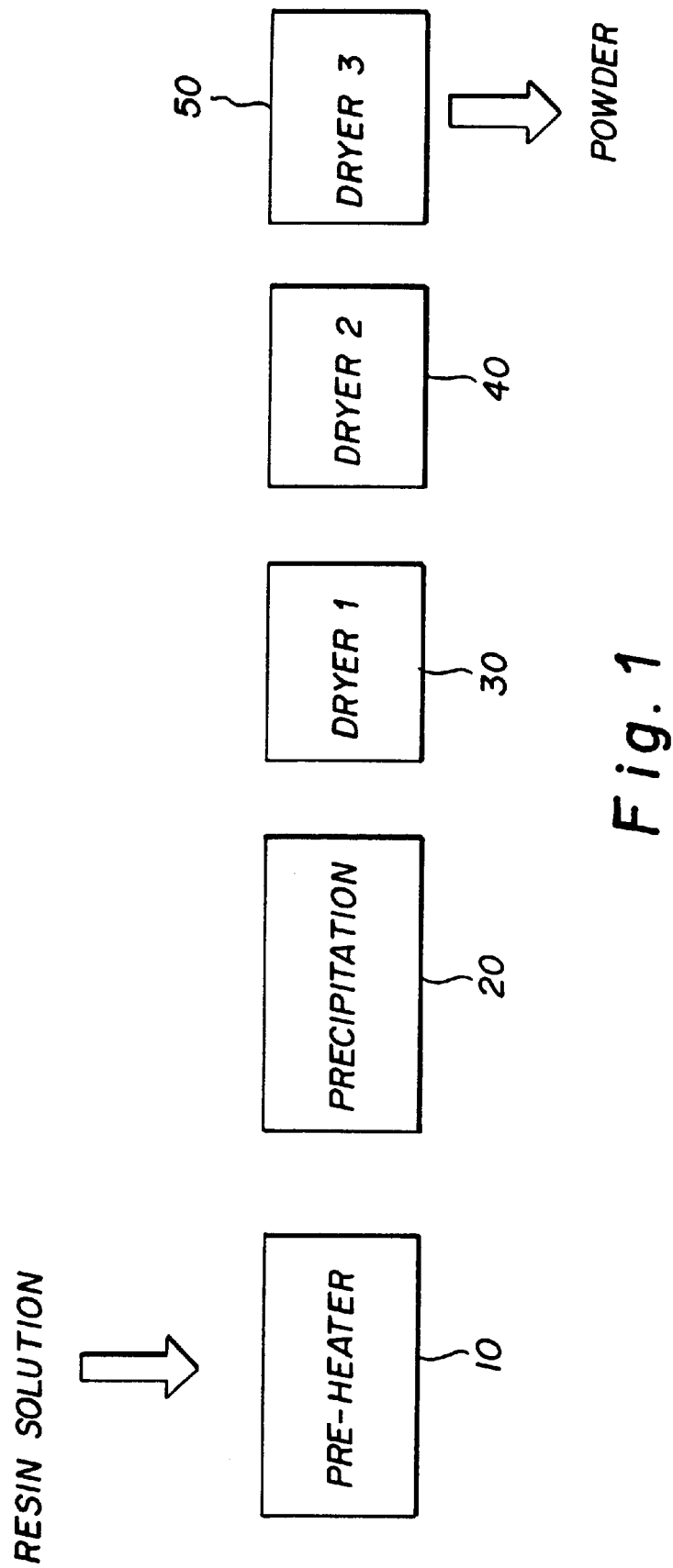
FIG. 1 depicts a diagrammatic view of an apparatus for isolating dry polycarbonate powder from polycarbonate solutions in organic solvents such as methylene chloride.
Figure 2:
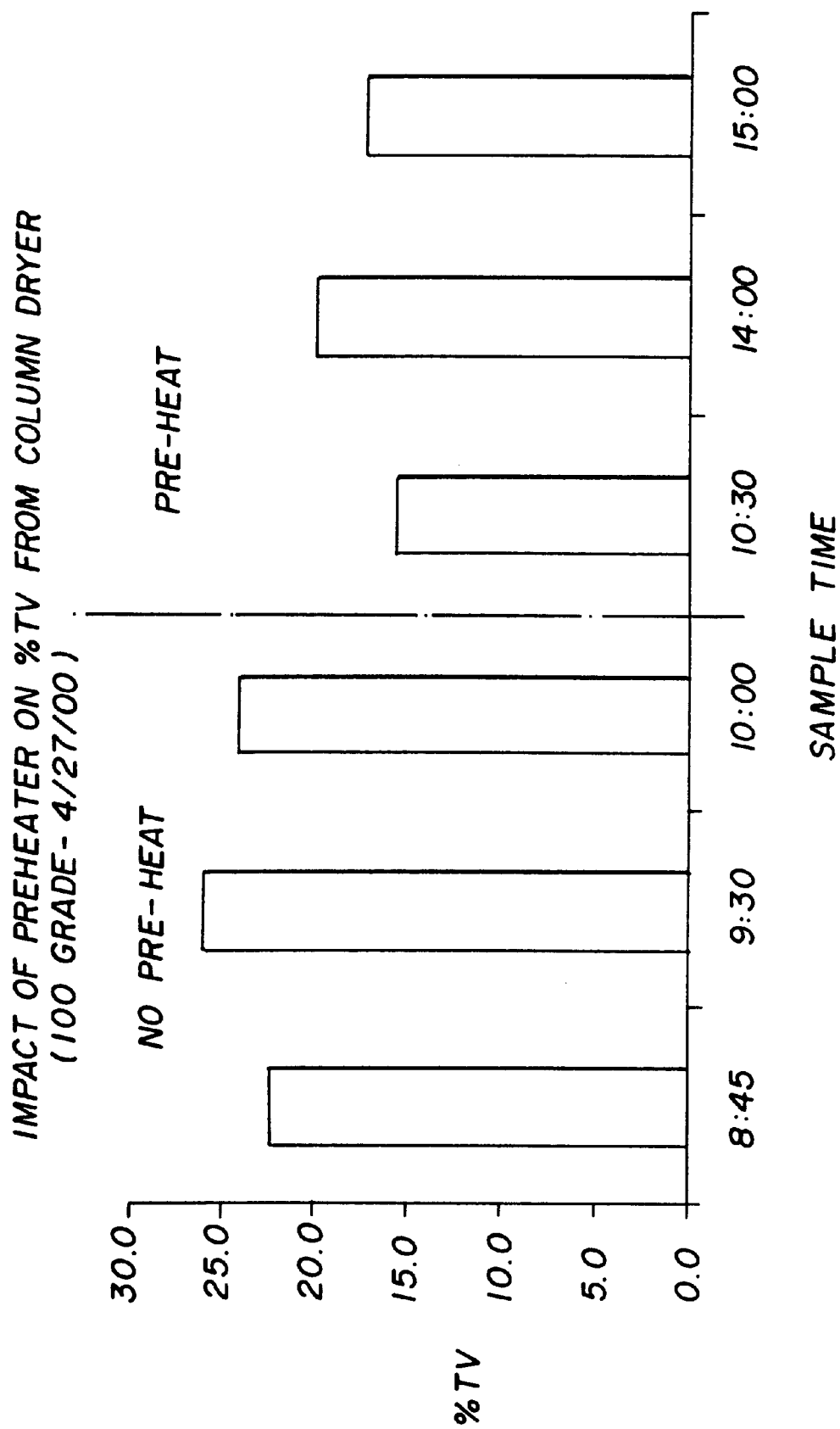
FIG. 2 depicts a graph showing the weight percentage total volatiles in wet polycarbonate powder prepared by steam precipitation with and without preheating the solution.
Figure 3:
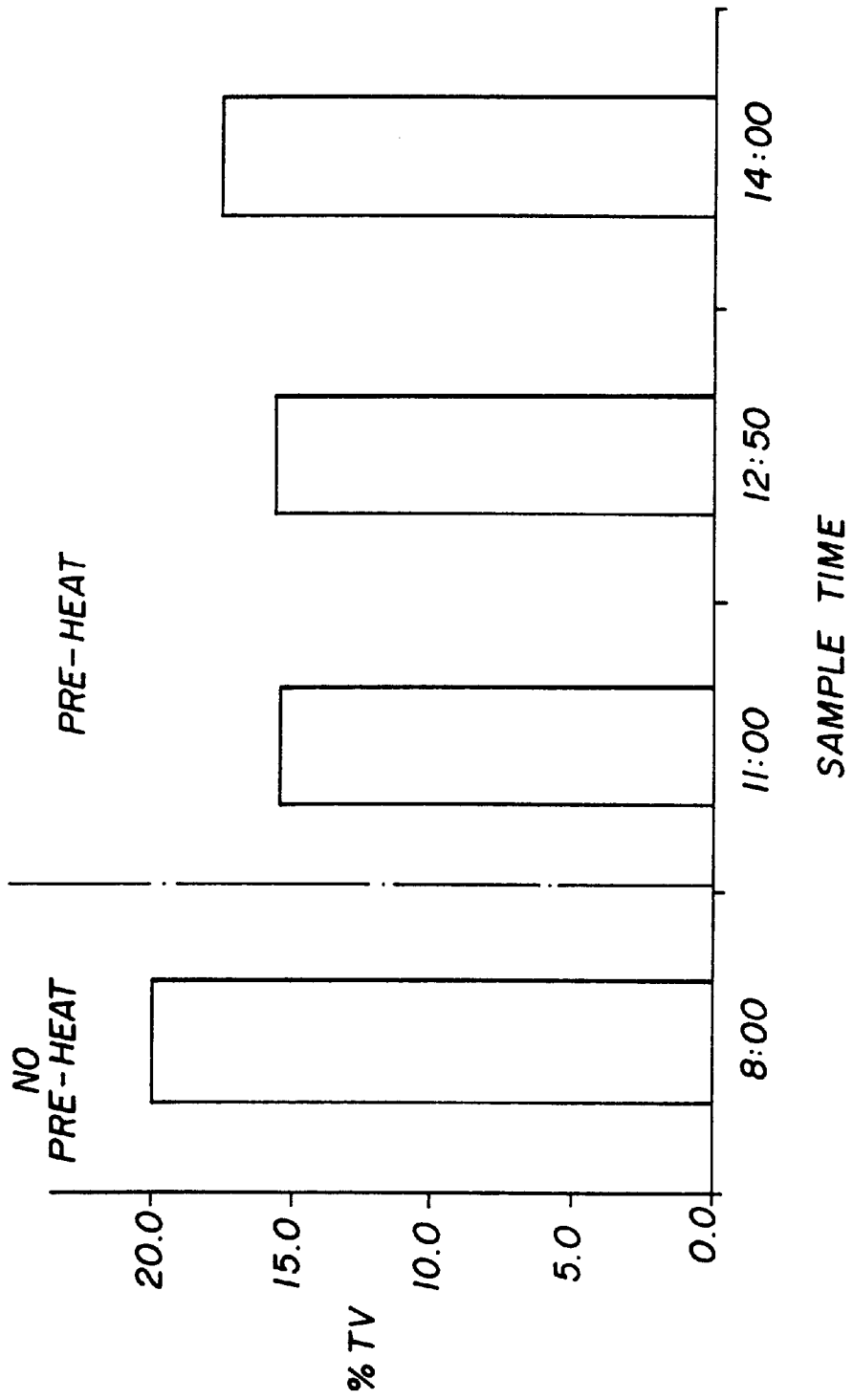
FIG. 3 depicts a graph showing the weight percentage total volatiles in wet brominated polycarbonate powder prepared by steam precipitation with and without preheating the solution.

An apparatus for performing the process according to the present invention is depicted in FIG. 1. A solution of polycarbonate in organic solvent, such as methylene chloride, is typically produced by the interfacial polycarbonate synthesis process. Other less preferred solvents that are not miscible with water, such as carbon tetrachloride, may also be used. However, methylene chloride is the typical industrial choice. The solution most preferably comprises about 20 to 30 weight percent polycarbonate, but may contain more or less.

The solution is next introduced into a preheater. The preheater may be any compatible design, but is typically some sort of heat exchanger. A tubular heat exchanger was chosen for ease of cleaning. However this is not the only type of heat exchanger that would work for this invention; any device allowing heat transfer from a heat transfer medium (such as condensing steam or hot oil) to the resin solution could work for the application.

In the preheater 10, the resin is heated to a temperature high enough to lower the residual water in the powder after steam precipitation, but low enough to prevent decomposition of the polycarbonate. Typically, the temperature of the solution is above 130° F. and below 600° F. It is desirable to make the temperature as high as possible while avoiding decomposition because in general, the higher the temperature, the less volatiles will be contained in the wet powder after steam precipitation. In a preferred embodiment of the invention, the temperature of the solution is greater than 170° F., in a more preferred embodiment above 200° F., and in a most preferred embodiment above 330° F.

After the preheater 10, the heated solution is introduced into a steam precipitation apparatus 20. Several different types of steam precipitation apparatus are appropriate, such as those described in U.S. Pat. Nos. 5,475,084, 3,508,339, 5,317,083 and 5,615,831, which are hereby incorporated by reference herein. A preferred type of steam precipitation apparatus uses a Venturi jet design such as that shown in U.S. Pat. No. 5,615,831.

Typically, the flowing steam atmosphere has a temperature of from 300° F. to 500° F. and a pressure of 100–210 psig. The temperature of the steam must be sufficiently high to vaporize methylene chloride, but should be sufficiently low to avoid fusion of particles caused by melting. Similarly, the pressure should be sufficiently high to supply a driving force for the devolatilization, but must be low enough to minimize condensation of the steam. The steam to resin weight ratio is between 1 and 4, and more preferably from 1.2 to 2.5.

The wet polycarbonate particles exiting from the steam precipitation jet are collected in a receiving tube and passed on to a series of dryers 30, 40 and 50 (typically hot air) to convert the wet powder to dry powder. Such dryers are commercially available from Niro Soavi, S.p.A. of Italy (postdryer).

Sufficient dryer capacity should be used to produce a dry powder exiting the last dryer 50 having a weight percent total volatiles content of less than 1 wt % and preferably less than 0.1 wt %. For example, the powder can have a weight percent water content of less than 1.0%.

The dry powder may be compounded together with a variety of known additives and stabilizers, typically by feeding the powder together with the additives and/or stabilizers into a single or twin screw extruder.

As illustrated by the following examples, preheating the resin, as described herein, has several advantages. By preheating the resin, the weight percent total volatiles can be reduced by 19 to 27%. This reduction in volatiles is accomplished with perhaps a slight increase in particle size, but further experiments showed there is little effect on dryability. Specifically, if one applies heat to the particles and simultaneously graphs $\ln(wc/w)$ versus time in seconds, wherein wc is the weight fraction of moisture in the particle at the critical moisture level and w is weight fraction of moisture at drying time t, there is little change in slope from drying wet particles formed with and without preheating. The slope is determined in the transition drying regime, wherein the drying rate has moved from a constant drying rate to a continuously falling drying rate dominated by mixed drying mechanisms such as diffusion, surface tension, etc. For purposes of this application, the slope in this region is defined as "Dryability." The data indicates that preheating causes no adverse effects which make drying more difficult (e.g., morphology changes), and therefore the gain in obtaining a wet powder with lower percent volatiles is not offset by other effects. Also, no significant difference in bulk density of the final powder was observed upon comparing the preheating method described herein with an otherwise similar conventional steam isolation method.

EXAMPLES

Example 1 and 2

The impact of pre-heating the resin solution was evaluated in a steam precipitation system consisting of the following equipment:

Resin heater

Precipitation jet

Precipitation tube

Powder collection cyclone

Methylene devolatilization dryer, and

Water devolatilization dryer.

Resin solution was heated to the desired temperature by a tubular heat exchanger using steam. The heated solution was then pumped to the precipitation jet, where the resin solution was contacted with steam to form the polycarbonate particles. The polycarbonate particles were then conveyed through a jacketed tube to a powder collection cyclone. The cyclone separates the powder from the water-methylene chloride vapor. The powder was then transported to a methylene devolatilization dryer, where the residual methylene chloride was removed. Powder samples were obtained after the methylene chloride removal step.

The impact of the resin solution temperature on the product was evaluated by running the experiment without and with steam addition to the pre-heater. Samples were obtained at various points during the experiment, corresponding to different resin solution temperatures. The samples were obtained by sampling the resin powder after removal of methylene chloride in the methylene chloride devolatilization step.

Example 1

Polycarbonate homopolymer was precipitated with and without solution preheating. Prior to solution preheating, the polycarbonate powder was isolated by contacting 19.8 gpm (gallons per minute) of polycarbonate solution with 9975 pph (pounds per hour) of steam. The concentration of polycarbonate in methylene chloride was 22.1 wt % polycarbonate.

The preheater system was then started and the resin solution was heated to an average temperature of 214.6 degrees F. During this experiment, the average feed rate of resin solution to the precipitation jet was 24.0 gpm and the average steam flow rate was 9759 pph. The resin solution was 24.0 wt % (average) polycarbonate during this portion of the experiment. This data is summarized in Table I of FIG. 4.

Powder properties were analyzed for samples obtained without and with heating of the solution prior to precipitation. The average % volatiles decreased from 24.0 weight % to 17.5 weight % (see Table II). This translates to a reduction of water content of 0.104 pounds of water per pound of polycarbonate.

Example 2

Brominated polycarbonate was precipitated with and without solution preheating. Prior to solution preheating, the polycarbonate powder was isolated by contacting 25.0 gpm of polymer solution with 9751 pph (pounds per hour) of steam. The concentration of polycarbonate in methylene chloride was 25.6 wt % polycarbonate.

The preheater system was then started and the resin solution was heated to an average temperature of 214.1 degrees F. During this experiment, the average feed rate of resin solution to the precipitation jet was 25.3 gpm and the average steam flow rate was 9240 pph. The resin solution was 26.0 wt % (average) polycarbonate during this portion of the experiment. This data is summarized in Table I of FIG. 4.

Powder properties were analyzed for samples obtained without and with heating of the solution prior to precipitation. The average % volatiles decreased from 20.1 weight % to 16.2 weight %. This translates to a reduction of water content of 0.058 pounds of water per pound of polycarbonate.

Example 3

Table II describes the powder samples obtained when performing several runs according to Examples 1 and 2.

sample of wet powder evaluated. The loss in weight determined the initial mass of volatile species in the sample (primarily water). The "dryability" of the sample was measured by recording the weight loss of the sample as a function of time.

The particle size distribution was measured by mechanical sieving of the samples in a Gradex 2000 Particle Analyzer. The sieves used included 4, 7, 10, 14, 20, 40, 60, 100 and 200 US mesh screens. The coarse fraction was defined as the weight % of material on the 4 and 7 mesh screens. The fines fraction was defined as the weight % of material on the 200 mesh screen and in the pan.

The preferred particle size distribution is one that is neither too coarse nor too fine. Coarse fractions less than 1.5 weight % are preferred; higher amounts lead to difficulties in full removal of water and other volatile species. Fine fractions can be less than 5%, with less than 4% preferred, since higher amounts can make the powder difficult to handle and can reduce the bulk density.

In addition, the weight % of material >20 mesh gives an idea of the average particle size in the polycarbonate. For example, 50 weight % greater than 20 mesh would mean that the average particle diameter would be in the range of 0.840–1.410 mm. The preferred range for the weight % >20 mesh is 40 to 70%. Less than 40% means that the powder contains a large amount of fines. Greater than 70% above 20 mesh means that the powder has a large fraction of large diameter particles that can adversely affect the removal of solvent and water from the particles.

Although the present invention has been described in considerable detail with respect to preferred versions thereof, other variations are possible. For example, any heat transfer equipment that allows heating of the resin solution to the targeted temperature would be acceptable for the proposed invention. Therefore, the spirit and scope of the appended claims should not be limited to the preferred versions contained herein.

TABLE II

| Grade | Preheat | (DRY) BD | % TV | Dryability | % > 20 | Coarse | Fines |
|---|---|---|---|---|---|---|---|
| Homopolymer | No | 12.0 ± 0.01 | 20.2 | 4.08 | 43.1 | 0.0 | 1.5 |
| Homopolymer | No | 12.8 ± 0.02 | 22.2 | 4.18 | 44.9 | 0.0 | 0.0 |
| Homopolymer | No | 12.6 ± 0.02 | 25.8 |  | 44.5 | 0.0 | 1.0 |
| Homopolymer | No | 12.7 ± 0.19 | 23.9 | 5.28 | 47.5 | 0.0 | 0.0 |
| Homopolymer | Yes | 13.0 ± 0.01 | 15.5 | 10.45 | 51.6 | 0.0 | 1.4 |
| Homopolymer | Yes | 13.0 ± 0.01 | 19.8 | 5.10 | 61.3 | 0.0 | 0.1 |
| Homopolymer | Yes | 12.9 ± 0.01 | 17.1 | 4.99 | 54.9 | 0.0 | 0.2 |
| Brom-PC | No | 13.1 ± 0.01 | 20.1 | 6.57 | 47.2 | 0.0 | 0.9 |
| Brom-PC | Yes | 13.5 ± 0.01 | 15.4 | 8.69 | 52.5 | 0.3 | 0.1 |
| Brom-PC | Yes | 13.9 ± 0.01 | 15.6 | 7.16 | 51.1 | 0.0 | 1.4 |
| Brom-PC | Yes | 13.9 ± 0.01 | 17.6 | 5.78 | 56.2 | 0.3 | 0.4 |

BD = bulk density (lb/cubic foot)
% TV = total moisture in sample (weight %)
% > 20 = weight fraction of powder > 20 mesh
Coarse = weight % powder > 7 mesh
Fines = weight % powder < 100 mesh The bulk density was determined by dividing sample mass by volume as measured in a graduated cylinder. Powder samples were dried in a laboratory oven at 120 deg. C. to remove residual water. The bulk density was determined by allowing a mass of powder to free-fall into the cylinder through a funnel. Based on the mass and the volume, the bulk density was determined.

The total volatiles were measured by loss in weight analysis using a Mettler LJ16 moisture analyzer. A 5–10 g

What is claimed is:

1. A process for isolating polycarbonate, which process comprises:
   a) heating a solution of polycarbonate comprising a nonaqueous solvent to a temperature greater than 130° F., and
   b) subsequently atomizing said heated solution by spraying said solution out of a nozzle into a flowing steam atmosphere to evaporate the nonaqueous solvent, and c) collecting the wet powder formed upon evaporation of the nonaqueous solvent, wherein the steam to resin weight ratio is from 1.2 to 2.5.

2. The process according to claim 1, wherein the nonaqueous solvent is methylene chloride.

3. The process according to claim 2, wherein the solution is heated to a temperature of greater than 170° F. and less than 600° F.

4. The process according to claim 3, wherein the solution is heated to a temperature of greater than 200° F.

5. The process according to claim 4, wherein the solution is heated to a temperature greater than 330° F.

6. The process according to claim 1, wherein the jet is a Venturi jet.

7. The process according to claim 1, wherein the weight percent solids in the solution of polycarbonate is from 20 to 30 percent.

8. The process according to claim 1, wherein the steam temperature is from 300 to 500° F., and the steam pressure is from 100 to 210 psig.

9. The process according to claim 1, wherein the wet powder has a weight percent water content of less than 1.0%.

10. The process according to claim 1, which further comprises compounding together the polycarbonate together with an additive/stabilizer package.

11. The process according to claim 1, wherein the fines fraction is less than 5 weight percent.

12. The process according to claim 1, wherein the coarse fraction is less than 1.5 weight percent.

13. The process according to claim 11, wherein the fines fraction is less than 4 weight percent.

14. The process according to claim 1, wherein the weight percent of powder of greater than 20 mesh is from 40 to 70 weight percent of the total.

15. A process for isolating polycarbonate which comprises heating a solution comprising polycarbonate and methylene chloride to at least 130° F., subsequently subjecting said solution to steam precipitation to form wet polycarbonate particles, and subsequently drying said particles, wherein the steam to resin weight ratio during steam precipitation is from 1.2 to 2.5.

16. The process according to claim 1, wherein the solution is heated to a temperature of greater than 170° F. and less than 600° F.

17. The process according to claim 18, wherein the solution is heated to a temperature of greater than 200° F.

18. The process according to claim 17, wherein the solution is heated to a temperature greater than 330° F.

19. The process according to claim 15, wherein the solution is heated to a temperature of greater than 170° F. and less than 600° F.

20. The process according to claim 19, wherein the solution is heated to a temperature of greater than 200° F.

21. The process according to claim 20, wherein the solution is heated to a temperature greater than 330° F.

* * * * *